United States Patent
So et al.

(10) Patent No.: US 7,522,583 B2
(45) Date of Patent: Apr. 21, 2009

(54) COMMUNICATION TERMINAL FOR WIRE AND WIRELESS INTERNET PHONE

(75) Inventors: Woon-Seob So, Daejeon (KR);
Dae-Hwan Hwang, Daejeon (KR)

(73) Assignee: Electronics and Telecommunications Research Insititute, Daejeon (KR)

( * ) Notice: Subject to any disclaimer, the term of this patent is extended or adjusted under 35 U.S.C. 154(b) by 1065 days.

(21) Appl. No.: 10/414,933

(22) Filed: Apr. 16, 2003

(65) Prior Publication Data

US 2004/0090949 A1    May 13, 2004

(30) Foreign Application Priority Data

Nov. 11, 2002    (KR) ...................... 10-2002-0069609

(51) Int. Cl.
| | |
|---|---|
| H04L 12/66 | (2006.01) |
| H04L 12/28 | (2006.01) |
| H04L 12/56 | (2006.01) |
| H04J 3/00 | (2006.01) |
| H04B 7/212 | (2006.01) |

(52) U.S. Cl. ...................... 370/353; 370/337; 370/347; 370/356; 370/395.1; 370/395.52

(58) Field of Classification Search .............. 370/310.1, 370/905, 912, 913, 337, 347, 353, 356, 395.1, 370/395.52
See application file for complete search history.

(56) References Cited

U.S. PATENT DOCUMENTS

| | | | | |
|---|---|---|---|---|
| 5,093,855 A | * | 3/1992 | Vollert et al. ............. | 379/88.02 |
| 6,075,788 A | * | 6/2000 | Vogel .................... | 370/395.51 |
| 6,345,047 B1 | | 2/2002 | Regnier | |
| 6,449,269 B1 | | 9/2002 | Edholm | |
| 6,456,625 B1 | * | 9/2002 | Itoi ............................ | 370/401 |
| 7,058,023 B2 | * | 6/2006 | Wynn .......................... | 370/254 |
| 7,092,375 B2 | * | 8/2006 | Pitsoulakis ................... | 370/338 |
| 7,197,029 B1 | * | 3/2007 | Osterhout et al. ........... | 370/353 |
| 7,296,186 B2 | * | 11/2007 | So et al. ....................... | 714/30 |
| 7,382,786 B2 | * | 6/2008 | Chen et al. ................... | 370/401 |
| 2001/0034758 A1 | * | 10/2001 | Kikinis ........................ | 709/203 |
| 2002/0080821 A1 | * | 6/2002 | Hwang ........................ | 370/474 |
| 2003/0048677 A1 | * | 3/2003 | Muneno ...................... | 365/200 |
| 2003/0110306 A1 | * | 6/2003 | Bailis et al. .................. | 709/253 |

(Continued)

FOREIGN PATENT DOCUMENTS

KR    1019990035946    3/2001

(Continued)

*Primary Examiner*—Fan Tsang
*Assistant Examiner*—Lisa Hashem
(74) *Attorney, Agent, or Firm*—Blakely, Sokoloff, Taylor & Zafman LLP

(57) ABSTRACT

Disclosed is a communication terminal for a wire and wireless network phone which comprises: a communication service controller, including a RISC processor, for processing protocols that satisfy respective communication interfaces in hardware and software manners; a reset unit for applying a reset signal to be used for the communication service controller; a clock signal unit for supplying clock signals needed for the communication service controller; a memory connected to the communication service controller, for storing a start program, a terminal management program, user data, and various application programs; and an access unit for providing a VoIP telephone function, a DSL access function, an analog telephone function, an Ethernet access function, a wireless network access function, and an EIA232 access function.

14 Claims, 3 Drawing Sheets

U.S. PATENT DOCUMENTS

| | | | |
|---|---|---|---|
| 2003/0112830 A1* | 6/2003 | So et al. | 370/524 |
| 2005/0083959 A1* | 4/2005 | Binder | 370/419 |
| 2005/0089052 A1* | 4/2005 | Chen et al. | 370/401 |
| 2005/0207405 A1* | 9/2005 | Dowling | 370/352 |
| 2005/0265323 A1* | 12/2005 | Thermond | 370/356 |
| 2006/0050688 A1* | 3/2006 | Panagopoulos et al. | 370/356 |
| 2006/0143526 A1* | 6/2006 | So et al. | 714/31 |
| 2007/0153771 A1* | 7/2007 | Doradla et al. | 370/352 |
| 2007/0280217 A1* | 12/2007 | Flanagan et al. | 370/356 |
| 2007/0286237 A1* | 12/2007 | Mallya | 370/477 |
| 2008/0151874 A1* | 6/2008 | Wynn | 370/352 |
| 2008/0151879 A1* | 6/2008 | Waldman et al. | 370/356 |

FOREIGN PATENT DOCUMENTS

| | | |
|---|---|---|
| KR | 2001-0099216 | 11/2001 |
| KR | 1020000071860 | 6/2002 |

* cited by examiner

COMMUNICATION TERMINAL FOR WIRE AND WIRELESS INTERNET PHONE

CROSS REFERENCE TO RELATED APPLICATION

This application is based on Korea Patent Application No. 2002-69609 filed on Nov. 11, 2002 in the Korean Intellectual Property Office, the content of which is incorporated herein by reference.

BACKGROUND OF THE INVENTION (a) Field of the Invention

The present invention relates to a communication terminal for a wire and wireless Internet phone. More specifically, the present invention relates to a communication terminal for a wire and wireless Internet phone for providing a telephone function and an Internet access function for free or for a very low charge through the Internet that is spread all over the world.

(b) Description of the Related Art

Conventionally, communication terminals for a wire Internet phone and a wireless Internet phone are separately configured and used within their respective limits in an Internet-using communication terminal. Also, since various devices with different functions are used to configure a terminal that uses a general communication network, the inner circuit configuration of the terminal becomes complex, the size of the terminal becomes large, and unnecessary functions are added. Therefore, it is difficult to design and develop the terminals, it requires much time to develop them, and the prices of the developed products become expensive. For example, to use an Internet phone at a home without an Ethernet environment, an ADSL (asymmetric digital subscriber line) terminal having an Ethernet port and an Internet phone having a wire Ethernet port are required.

In the prior art related to Internet phones, U.S. Pat. No. 6,345,047 (date of patent: Feb. 5, 2002) discloses an adapter for using a subscriber line and concurrently transmitting IP packets from a telephone and a computer.

Also, Korean published application No. 2002-0042107 (publication date: Jun. 5, 2002) discloses a wireless Internet phone that comprises an antenna, a switch, a transmission amplifier, a receiver, an RF/IF converter, and a baseband processing unit, and it provides a VoIP (voice over Internet protocol) function through the Internet, a wireless LAN (local area network) data communication function, and a gateway function.

Another Korean published application No. 2001-0019508 (publication date: Mar. 15, 2001) discloses an Internet phone accessing device for transmitting an IP (Internet protocol) address through the PSTN (public switched telephone network) to generate a call when a user requires Internet phone access.

SUMMARY OF THE INVENTION

It is an object of the present invention to provide a communication terminal for an Internet phone for using a communication service controller, into which essential functions necessary for providing quality voice calls and various Internet services are integrated at the time of configuring a communication terminal for a wire and wireless Internet phone, to minimize components, provide easy design, simplify configuration, lower cost, and reduce size, that can be used under wire/wireless environments.

In one aspect of the present invention, a communication terminal for a wire and wireless network phone comprises: a communication service controller, including a RISC (reduced instruction set computer) processor, for processing protocols that satisfy respective communication interfaces in hardware and software manners; a reset unit for applying a reset signal to be used for the communication service controller; a clock signal unit for supplying clock signals needed for the communication service controller; a memory connected to the communication service controller for storing a start program, a terminal management program, user data, and various application programs; and an access unit for providing a VoIP (voice over Internet protocol) telephone function, a DSL (digital subscriber line) access function, an analog telephone function, an Ethernet access function, a wireless network access function, and an EIA232 (electronic industries association 232) access function.

The communication terminal uses a communication service controller generated by integrating essential functions needed for providing quality voice calls and various Internet services to minimize component usage, and provide easy design and low cost. Also, the communication terminal may be used as an analog telephone when it is not connected to the Internet. Further, since the communication terminal has a simple configuration, it provides easy maintenance and good reliability, and it is possible to mount software of various terminal functions if needed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
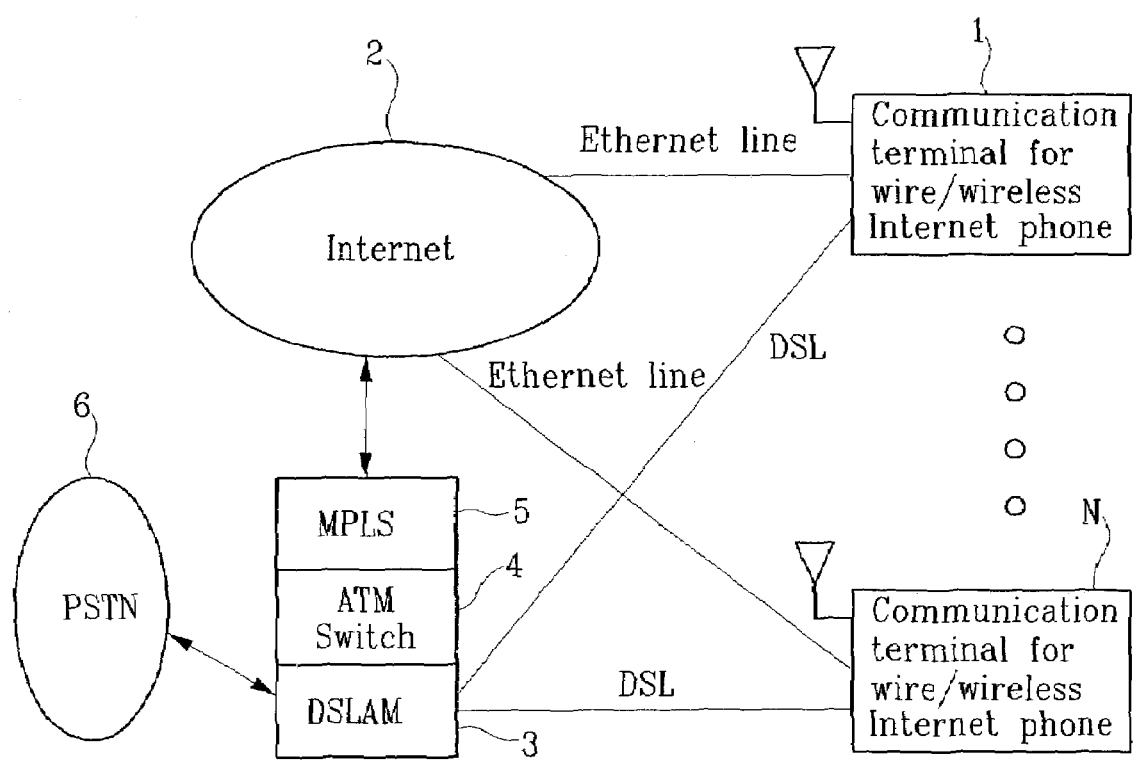
FIG. 1 shows a connection relation when a communication terminal for a wire and wireless Internet phone according to a preferred embodiment of the present invention is combined with the Internet.

FIG. 1 shows a connection relation when a communication terminal for a wire and wireless Internet phone according to a preferred embodiment of the present invention is combined with the Internet. As shown, a plurality of communication terminals 1 through N for wire and wireless Internet phones are connected to the Internet 2 through an Ethernet line, and concurrently connected to a DSLAM (digital subscriber line access module) 3 through a DSL (digital subscriber line.) The DSLAM 3 is connected to an ATM (asynchronous transfer mode) switch 4, and the ATM switch 4 is connected to the Internet 2 through an MPLS (multi protocol label switch) 5. An analog telephone line separated from the DSLAM 3 is connected to the PSTN.

The DSLAM 3 processes an access function performed through the DSL. Data processed by the DSLAM 3 may be reciprocally transferred to the ATM switch 4 through a fast link, and the analog telephone signal separated from the DSLAM 3 may be reciprocally transferred through the PSTN 6. The ATM switch 4 performs a function for switching ATM cells, and the MPLS 5 performs a reciprocal conversion and protocol conversion function between the ATM cells and Ethernet packets to execute data communication through the Internet.

Figure 2:
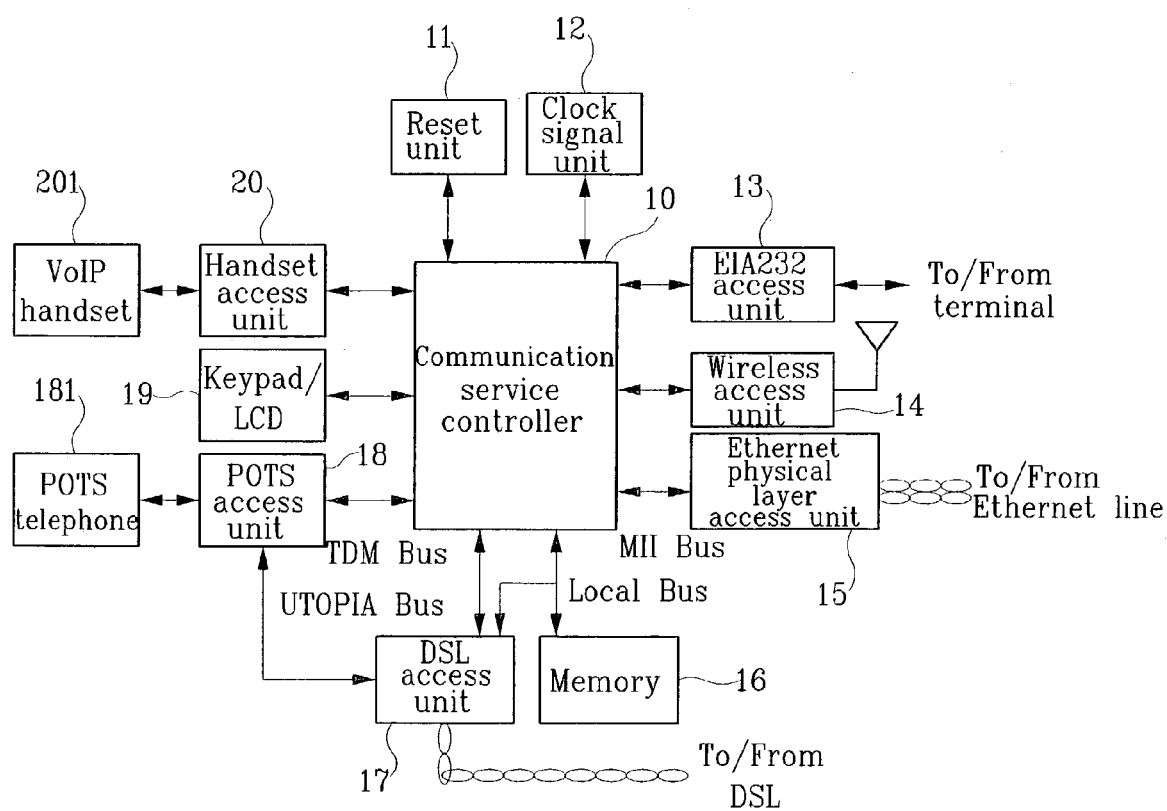
FIG. 2 shows a configuration of a communication terminal for a wire and wireless Internet phone according to a preferred embodiment of the present invention.

Referring to FIG. 2, a communication terminal for a wire and wireless Internet phone will be described.

FIG. 2 shows a configuration of a communication terminal for a wire and wireless Internet phone according to a preferred embodiment of the present invention.

As shown, the communication terminal for a wire and wireless Internet phone comprises: a communication service controller 10; and a plurality of interfaces, connected to the communication service controller 10, which are required for communication terminal functions.

The interfaces connected to the communication service controller 10 will now be described in detail.

A reset unit 11 performs a function for supplying power input reset signals and switch reset signals to the communication service controller 10 over a predetermined time. A clock signal unit 12 provides 50 MHz clock signals to the terminal. The 50 MHz clock signals are provided to the communication service controller 10 to be divided or multiplied as needed, and the divided or multiplied clock signals are applied to the circuits connected to the communication service controller 10.

A memory 16 is directly connected to the communication service controller 10, and it stores a start program and a terminal management program. The memory 16 comprises an F-ROM (flash read only memory) accessible via 8-bit, 16-bit, and 32-bit buses, and it also includes a DRAM (dynamic random access memory) or an SRAM (static random access memory) for temporarily storing user data and various application programs, being accessible via the 8-bit, 16-bit, and 32-bit buses, and an external element that is accessible in a memory map format and connectable to the communication service controller 10.

A VoIP handset 201 is connected to the communication service controller 10 through a handset access unit 20 to perform a handset function. The handset access unit 20 reciprocally converts various tone and voice analog signals into digital signals and voice analog signals into digital signals, and amplifies analog signals. Here, a microphone and a speaker may be connected to the handset access unit 20 to function as a speaker phone.

A keypad and LCD (liquid crystal display) 19 are directly connected to the communication service controller to perform external input and output functions. The keypad includes twelve default key buttons for dialing telephone numbers and specific numbers, and four supplementary key buttons for additional service functions. The supplementary key buttons include a menu key, a function setting key, and two control function keys. The LCD receives 8-bit data signals, display control signals, and control-related reference signals from the communication service controller 10, and displays all the terminal states and messages needed to the user. In this instance, the messages include on/off states of telephone actuation, dialing and dialed phone numbers, and current time, and the addition and deletion of various messages is possible through programming by the communication service controller 10.

A POTS (plain old telephone service) telephone 181 is an analog telephone connected to the PSTN. A POTS access unit 18 connects the POTS telephone 181 to a POTS telephone port of a DSL access unit 17 when the POTS telephone 181 is connected to the PSTN and used as an analog telephone, and the POTS access unit 18 provides ring signals, provides various tone signals, analyzes DTMF (dual tone multi frequency) input signals, and converts voltages needed for providing the ring signals when the POTS telephone 181 is connected to the Internet and is used as a VoIP telephone. The POTS access unit 18 is connected to the communication service controller 10 through a TDM (time division multiplexing) bus, and performs communication with the communication service controller 10 through transmitting/receiving clock signals TDMCLK, frame sync signals FS, transmitted data signals TDMTXD, and received data signals TDMRXD.

The DSL access unit 17 is connected to the communication service controller 10 through a local bus to be controlled by the communication service controller 10, and it is also connected to the communication service controller 10 through a UTOPIA (universal test and operation physical interface for ATM) bus to transmit and receive data. Also, the DSL access unit 17 is connected to a DSL to directly transmit and receive analog data and convert them into digital 10 data according to a DSL standard. The UTOPIA bus connected to the communication service controller 10 is an ATM physical standard bus, and the signals connected to the UTOPIA bus include: transmit-related signals comprising transmit data signals TXD7 through TXD0, a transmit cell start signal TXSOC, a transmit enable signal TXENB, a transmit cell enable signal TXCLAV, and a transmit data clock signal TXCLK; and receive-related signals comprising receive data signals RXD7 through RXD0, a receive cell start signal RXSOC, a receive enable signal RXENB, a receive cell receive enable signal RXCLAV, and a receive data clock signal RXCLK. Control signals connected to the local bus include 8-bit data signals UD7 through UD0, 8-bit address signals UA7 through UA0, a data read signal URDB, a data write signal UWRB, an address valid signal UASB, and a chip select signal CSB. The DSL access unit 17 may be directly connected to an ADSL (asymmetric DSL) line or a VDSL (very high bit rate DSL) line, and has a splitter function for the POTS telephone 181. The DSL access unit 17 converts transmitted and received analog data into digital signals, and performs DSL processing that includes performance of DSL framing and de-framing and performance of DSL coding and decoding.

An Ethernet physical interface access unit 15 is connected to the communication service controller 10 through a standard MII (media independent interface) bus, and performs a physical interface access function of 10 Base-T or 100 Base-T Ethernet. The MII bus includes: transmit-related signals comprising transmit data signals MTXD3 through MTXD0, a transmit enable signal MTXENB, a transmit data clock signal MTXCLK, and a transmit error signal MTXER; and receive-related signals comprising receive data signals MRXD3 through MRXD0, a receive enable signal MRXDVB, a receive data clock signal MRXCLK, a receive error signal MRXER, a carrier sense signal MCRS, a collision detect signal MCOL, an interrupt signal MINTR, a control data clock signal MDC, and control data signals MDIO.

A wireless access unit 14 having a radio frequency of 2.4 GHz or 5 GHz bands is connected to a wireless network. The wireless access unit 14 converts received analog signals into 10-bit digital data, and provides them to the communication service controller 10. Also, the wireless access unit 14 converts 8-bit digital data output by the communication service controller 10 into analog signals, and transmits them to the wireless network.

An EIA232 (electronic industries association 232) access unit 13 is connected through an EIA232 port to a terminal for providing an Internet access service function. The EIA232 access unit 13 comprises a signal level driver and a transmitter, and is connected to the terminal through transmit data signals, receive data signals, transmit request signals, and receive ready signals.

The communication service controller 10 includes an RISC (reduced instruction set computer) processor, and is connected to the above-noted components to process protocols matched with communication methods of the components and to function as a communication terminal in the hardware and software manners.

Figure 3:
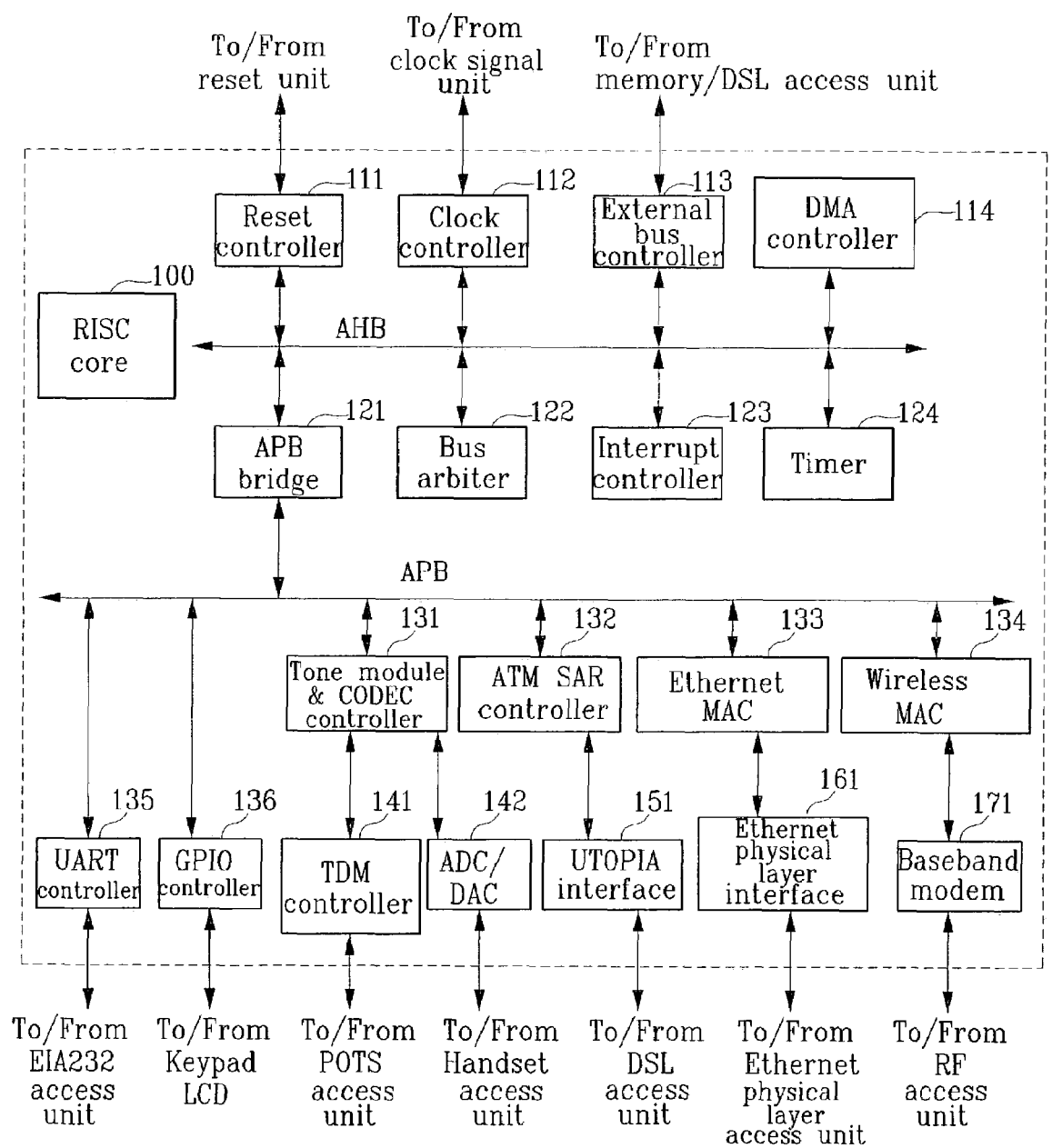
FIG. 3 shows a detailed configuration of a communication service controller shown in FIG. 2.

Referring to FIG. 3, the communication service controller 10 will be described in further detail.

FIG. 3 shows the detailed communication service controller 10 shown in FIG. 2.

As shown, the communication service controller 10 of a communication terminal for a wire and wireless Internet phone according to the preferred embodiment of the present invention comprises an AHB (advanced host bus), an APB (advanced peripheral bus), an APB bridge 121 for connecting the AHB with the APB, system-related units connected to the AHB, and access-related units connected to the APB.

The system-related units comprise a reset controller 111, a clock signal controller 112, a RISC core 100, an external bus controller 113, a DMA (direct memory access) controller 114, a bus arbiter 122, an interrupt controller 123, and a timer 124.

Also, the access-related units comprise a UART (universal asynchronous receiver/transmitter) controller 135, an input/output controller 136, a tone module and codec controller 131, an ATM SAR (segmentation and reassemble) controller 132, an Ethernet MAC (media access controller) 133, and a wireless MAC 134. A TDM (time division multiplexing) controller 141 and an ADC/DAC (analog to digital converter/digital to analog converter) 142 are connected to the tone module and codec controller 131, and a UTOPIA interface 151 is connected to the ATM SAR controller 132. The Ethernet MAC 133 is connected to a wire Ethernet physical layer interface 161, and a wireless MAC 134 is connected to a wireless baseband modem 171.

The reset controller 111 is connected to the reset unit 11 of FIG. 2 to reset all the controllers according to externally input reset signals, generate reset signals needed for the respective controllers, and supply them to the AHB.

The clock signal controller 112 is connected to the clock signal unit 12 of FIG. 2 to receive externally input 50 MHz clock signals, and generate internally needed clock signals through a PLL (phase-locked loop).

The external bus controller 113 generates control signals for reading data from a memory or writing data in the memory to access a flash memory, a static memory, or a dynamic memory of the memory 16, in synchronization with predetermined timing.

The DMA controller 141 generates control signals for quickly performing data communication between the respective controllers and the memory without control by a processor, and supplies them.

The RISC core 100 which is a RISC microprocessor with 32-bit data processing performance performs whole central control processing functions of the communication service controller 10.

The bus arbiter 122 controls the right to use buses of the respective controllers, the buses being connected to the AHB together with the RISC core.

The interrupt controller 123 processes internal and external interrupts generated by execution of programs, and the timer 124 receives reference clock signals to generate appropriate timing signals at a predetermined time assigned by the program.

The APB bridge 121 connects data signals, address signals, and control signals so as to match the reciprocal buses between the AHB and the APB with timing of each bus.

The UART controller 135 controls the data input and output speed to a maximum of 230.4 kbps to perform EIA232 communication, and processes the data according to the UART protocol.

The input/output controller 136 processes the input/output signals used as various control signals. For example, the input/output controller 136 receives keypad data and DTMF data signals, and transmits LCD data and LED driving signals.

The tone module and codec controller 131 generates sixteen types of DTMF data, monotone data, and melody data following the ITU-T Q.23 standard, and transmits the data to one of the TDM controller 141 and the ADC/DAC 142 or processes signals in the opposite direction. The TDM controller 141 includes a time division multiplexer and a demultiplexer, and transmits and receives data to/from external devices that have a TDM bus interface. Though not illustrated, an image processing element may be connected to the TDM bus when the terminal according to the embodiment is used as a videophone. The ADC/DAC 142 performs data conversion between a codec controller and a handset.

The ATM SAR controller 132 segments packet-type user data read from the memory 16 of FIG. 2 through the APB into ATM cells to transmit them to the UTOPIA interface 151, and converts the ATM cells received from the UTOPIA interface 151 into packet-type user data to record them in the memory 16 of FIG. 2 through the APB, and through this process, it processes the protocol of the ATM layer. The UTOPIA interface 151 generates control signals required for interface with the UTOPIA bus according to time matched with a corresponding standard.

The Ethernet MAC 133 processes a MAC function protocol on the Ethernet interface, and the Ethernet physical layer interface 161 reciprocally converts MAC frames into Ethernet physical frames.

The wireless MAC 134 processes a MAC function protocol on the wireless modem interface, and the baseband modem 171 performs an OFDM (orthogonal frequency division multiplexing) modem function following the IEEE 802.g standard. The communication terminal for a wire and wireless Internet phone is directly connected to the Ethernet, or it is connected to the Internet through the DSL to provide the user with an Internet voice telephone function and an Internet access function. Also, when not connected to the Internet, it is possible to use a voice telephone through the PSTN. In addition, the communication terminal may process various functions required by the user by simply modifying functions and adding desired functions without being restricted to the above-described functions. For example, when a video signal processing element is added, a videophone function may be processed, and it may also be applied to wireless access points.

As described above, the communication terminal uses a communication service controller generated by integrating essential functions needed for providing quality voice calls and various Internet services to minimize component usage, and provide easy design and low cost. Also, the communication terminal may be used as an analog telephone when it is not connected to the Internet. Further since the communication terminal has a simple configuration, it provides easy maintenance and good reliability, and it is possible to mount software of various terminal functions if needed.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. A communication terminal for a wire and wireless network phone comprising:
    a communication service controller, including a RISC (reduced instruction set computer) processor, for processing protocols that satisfy respective communication interfaces in hardware and software manners;
    a reset unit for applying a reset signal to be used for the communication service controller;
    a clock signal unit for supplying clock signals needed for the communication service controller;
    a memory connected to the communication service controller, for storing a start program, a terminal management program, user data, and various application programs; and
    access units for providing a VoIP (voice over Internet protocol) telephone function, a DSL (digital subscriber line) access function, an analog telephone function, an Ethernet access function, a wireless network access function, and an EIA232 (electronic industries association 232) access function, wherein the communication service controller further comprises:
    an AHB (advanced host bus) for connecting the RISC processor to the reset unit, the clock signal unit, and the memory through respective controllers; and
    an APB (advanced peripheral bus) coupled to the AHB for connecting the access units through respective interfaces,
    wherein the access units comprise:
    a DSL access unit, connected between the communication service controller and a DSL, for performing an access function of the DSL of the terminal; and
    an Ethernet physical access unit, connected between the communication service controller and an Ethernet, for performing an access function of an Ethernet physical layer,
    wherein the communication terminal for a wire and wireless network phone is connected to a network through an Ethernet line and to the DSL access unit through a DSL, and the DSL access unit is connected to the network and a PSTN (public switched telephone network) through an ATM (Asynchronous Transfer Mode) switch.

2. The communication terminal of claim 1, further comprising:
    a keyboard, directly connected to the communication service controller, for performing a key input function by a user; and
    an LCD (liquid crystal display), directly connected to the communication service controller, for displaying states of the terminal and messages necessary for the user.

3. The communication terminal of claim 1, wherein the memory comprises:
    a first memory accessible through 8-bit, 16-bit, and 32-bit buses, for storing the start program and the terminal management program; and
    a second memory accessible through 8-bit, 16-bit, and 32-bit buses, for storing the user data and the various application programs.

4. The communication terminal of claim 1, wherein the access units comprise:
    a handset access unit, connected to the communication service controller, for performing digital/analog reciprocal conversion on various tone signals and voice signals, and performing amplification on analog signals;
    an analog telephone access unit, connected to the communication service controller, an analog telephone, and the DSL access unit, for performing an access function of the analog telephone;
    a wireless access unit, connected to the communication service controller, for performing an access function to a wireless network; and
    an EIA232 access unit connected through an EIA232 port to a terminal for providing a network access service function.

5. The communication terminal of claim 4, wherein the DSL access unit is controlled by the communication service controller through a local bus, it is connected to the communication service controller through a UTOPIA (universal test and operation physical interface for ATM) bus to transmit and receive data, and it is connected to the DSL to directly transmit analog data and convert the analog data into digital data according to a DSL standard.

6. The communication terminal of claim 5, wherein the DSL access unit transmits transmit-related signals including transmit data signals, transmit cell start signals, transmit enable signals, transmit cell enable signals, and transmit data clock signals; and receive-related signals including receive data signals, receive cell start signals, receive enable signals, receive cell receive signals, and receive data clock signals through the UTOPIA bus.

7. The communication terminal of claim 5, wherein the DSL access unit transmits data signals, address signals, data read signals that are control signals, data write signals, address valid signals, and chip select signals, through the local bus.

8. The communication terminal of claim 4, wherein the Ethernet physical layer access unit is connected to the communication service controller through a standard MII bus to perform a physical layer access function of the 10 Base-T or 100 Base-T Ethernet.

9. The communication terminal of claim 8, wherein the Ethernet physical layer access unit transmits transmit-related signals including transmit data signals, transmit enable signals, transmit data clock signals, and transmit error signals; and receive-related signals including receive data signals, receive enable signals, receive data clock signals, receive error signals, carrier sense signals, collision detect signals, interrupt signals, control data clock signals, and control data signals.

10. The communication terminal of claim 1, wherein the communication service controller comprises an APB bridge for connecting the AHB and the APB, a system-related unit connected to the AHB, and an access-related unit connected to the APB.

11. The communication terminal of claim 10, wherein the system-related unit comprises:
    a reset controller for generating reset signals needed for respective controllers according to externally input reset signals, and applying them to the AHB;

a clock signal controller for receiving externally input clock signals, and generating clock signals having frequencies required by the respective controllers;

a RISC (reduced instruction set computer) core, that is the RISC processor having 32-bit processing performance, for performing a whole central control processing function of the communication service controller;

an external bus controller for accessing the memory;

a DMA (direct memory access) controller for accessing the memory without control by the RISC core;

a bus arbiter, connected to the AHB together with the RISC core, for controlling the right to use buses provided between the respective controllers;

an interrupt controller for processing internal and external interrupts generated during execution of a program; and a timer for providing reference timing of the respective controllers.

12. The communication terminal of claim 10, wherein the access-related unit comprises:

a UART (universal asynchronous receiver/transmitter) controller for controlling data input for EIA232 (electronic industries association 232) communication, and processing the data according to the UART protocol;

an input/output controller for processing inputs/outputs of key input signals and display output signals;

a tone module and codec controller for generating DTMF (dual tone multi frequency) data, monotone data, and melody data following the ITU-T Q.23 standard;

an ATM SAR (asynchronous transfer mode segmentation and reassemble) controller for segmenting packet-type user data read from the memory through the APB into ATM cells to transmit them to a UTOPIA interface, and converting the ATM cells received from the UTOPIA interface into packet-type user data to transmit them to the memory through the APB;

an Ethernet MAC (media access controller) for processing a media access control function protocol of an Ethernet interface; and a wireless MAC for processing a media access control function protocol of a wireless modem interface.

13. A communication terminal for a wire and wireless network phone comprising:

a communication service controller, including a RISC (reduced instruction set computer) processor, for processing protocols that satisfy respective communication interfaces in hardware and software manners;

a reset unit for applying a reset signal to be used for the communication service controller;

a clock signal unit for supplying clock signals needed for the communication service controller;

a memory connected to the communication service controller, for storing a start program, a terminal management program, user data, and various application programs; and access units for providing a VoIP (voice over Internet protocol) telephone function, a DSL (digital subscriber line) access function, an analog telephone function, an Ethernet access function, a wireless network access function, and an EIA232 (electronic industries association 232) access function, wherein the communication service controller further comprises:

an AHB (advanced host bus) for connecting the RISC processor to the reset unit, the clock signal unit, and the memory through respective controllers; and an APB (advanced peripheral bus) coupled to the AHB for connecting the access units through respective interfaces, wherein the access units comprise:

a DSL access unit, connected between the communication service controller and a DSL, for performing the DSL access function of the communication terminal; and an Ethernet physical access unit, connected between the communication service controller and an Ethernet, for performing an access function of an Ethernet physical layer, wherein the communication terminal is connected to an Internet through the Ethernet and to a DSL access module (DSLAM) through the DSL, and the DSLAM is connected to the Internet through an ATM (Asynchronous Transfer Mode) switch and also connected to a PSTN (public switched telephone network).

14. The communication terminal of claim 13, wherein the access units comprise:

a handset access unit, connected to the communication service controller, for performing digital/analog reciprocal conversion on various tone signals and voice signals, and performing amplification on analog signals;

an analog telephone access unit, connected to the communication service controller, an analog telephone, and the DSL access unit, for performing an access function of the analog telephone;

a wireless access unit, connected to the communication service controller, for performing an access function to a wireless network; and an EIA232 access unit connected through an EIA232 port to a terminal for providing a network access service function.

* * * * *